Feb. 28, 1939.   C. HAMPE ET AL   2,148,746
PIPE COUPLING
Filed Oct. 21, 1937
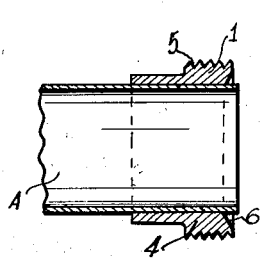
FIG.1
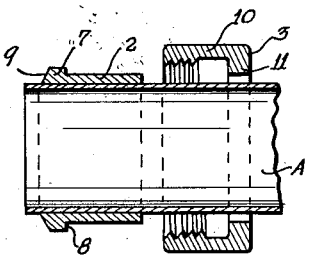
FIG.2
FIG.3
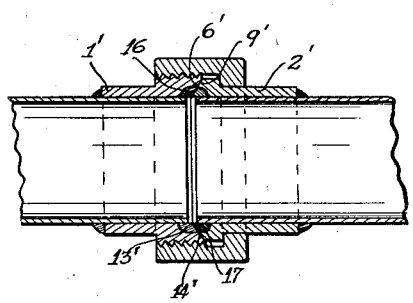
FIG.4
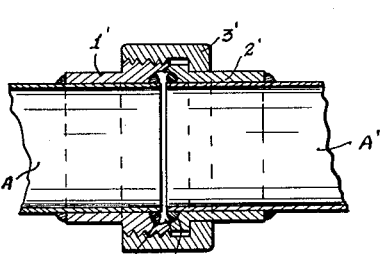
FIG.5
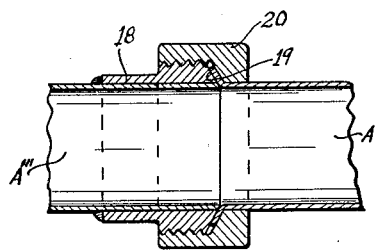
FIG.6
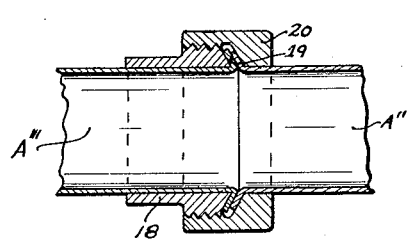
FIG.7
INVENTOR
Carl Hampe &
Everett Kleisly
BY Ralph Kalish
ATTORNEY Patented Feb. 28, 1939

2,148,746

UNITED STATES PATENT OFFICE 2,148,746

PIPE COUPLING

Carl Hampe and Everett Kleisly, St. Louis, Mo.

Application October 21, 1937, Serial No. 170,146

2 Claims. (Cl. 285—120)

This invention relates to certain new and useful improvements in pipe couplings and the method of making and using the same.

In certain industries at the present time, such as the milk and beverage bottling industries, the pipes and vessels in which the beverage is conveyed and handled must be repeatedly cleaned in a very thorough and hygienic manner. In fact, in numerous cities throughout this and other countries the maintenance of sanitary conditions in plants of this character is rigidly governed by statute and regulations.

In the milk bottling industry in the United States, for instance, most large municipalities have milk regulation ordinances, which, among other things, require that all the pipes and vessels with which the beverage comes into direct contact must be emptied at regular stated periods and thoroughly cleaned. The regulations set up under these ordinances frequently require that even conduit pipes through which the liquid is conveyed must be taken apart every day and thoroughly cleaned out. These regulations even go so far as to specify the particular type of pipe which must be used, the size of the pipe, the maximum permissible angularity of the bends in the pipe, and the particular manner in which the pipes may be connected to each other and to the vessels into which the beverage flows.

The regulations covering the pipe connecting fittings prevent the use of ordinary pipe connections, such as the sleeve and nipple type, and instead require the use of various types of so-called sanitary unions. These sanitary unions at the present time are variously constructed to meet the requirements of the regulations. However, actual experience and research have shown that even the approved type of unions available at the present time in some manner or other have a non-accessible crevice between the pipe and the fitting, in which various pathogenic spores may accumulate with resultant deleterious effect upon the beverage. In the case of hot milk moving through pipes from the pasteurizer to the cooling towers, the faces of the pipe fittings in the course of even one day's operation will become caked with a thick scum that must actually be scraped away from the metallic surface. Obviously, therefore, fittings of this character should preferably be so arranged that any crevices or juncture points are readily accessible and may be easily scraped or otherwise cleansed to prevent excessive accumulation of deleterious bacterial matter.

Apart from the purely hygienic aspect, there are a number of practical considerations involved. It will be apparent that sanitary pipe fittings of the character under discussion must necessarily be taken apart and put back together again with relatively great frequency, thereby producing considerable wear and consequent need for replacement. This being the case, it is desirable that the pipe fitting be simple in construction, so that it may be readily taken apart and put back together again without undue loss of time. In addition to this, it is furthermore extremely desirable that such a fitting may be readily replaced or reconditioned in a simple, speedy, and economical manner.

It is hence an object of the present invention to provide a pipe coupling or fitting and method for making and using the same which is extremely sanitary, presenting entirely accessible and thoroughly cleansable surfaces; which is simple, economical, and yet sturdy and rugged in construction; which may be installed and utilized with a minimum of labor expense; which may be readily maintained and replaced in a relatively speedy, efficient, and economical manner; and which is otherwise highly efficient in the performance of its intended functions.

And with the above and other objects in view, our invention resides in the novel features of form, construction, arrangement, and combination of parts presently described and pointed out in the claims.

In the accompanying drawing,—

Figure 1 is a longitudinal sectional view of a pipe coupling constructed in accordance with and embodying our present invention, illustrating particularly the pipe coupling as it is loosely fitted over a section of pipe and prior to actual rigid connection thereto;

Figure 2 is a longitudinal sectional view of the pipe fitting, illustrating the fitting sections rigidly connected to the pipe prior to the trimming and fitting operation;

Figure 3 is a longiudinal sectional view of the fitting and pipe section in finished form; and Figures 4, 5, 6, and 7 are longitudinal sectional views, respectively, of modified forms of the present invention.

Referring now in more detail and by reference characters to the drawing, which illustrates a preferred embodiment of the present invention, A, A', respectively, designate two pieces of metallic pipe which are to be joined together. The fitting comprises preferably three component parts, namely, a male sleeve 1, a female sleeve 2, and a locking collar 3. The male sleeve 1 is axially bored or machined to a diameter which is approximately .005 to .01 inch larger than the outside diameter of the pipe A over which it is to be fitted, so that it will slide freely in collar-wise fashion thereover. The male sleeve 1 is further provided at its so-called joint-forming end with an enlarged annular rim 4, which is provided with an external machine thread 5 and on its outwardly presented transverse face is beveled inwardly to provide a joint face 6. The female sleeve 2 is likewise bored or machined to an inside diameter which is approximately .005 to .01 inch larger than the outside diameter of the pipe section A' over which it is to be fitted, so that it will slide loosely and freely thereover. This female sleeve is further provided at its joint-forming end with a preferably integrally enlarged annular rim 7, which is of substantially smaller external diametrical size than the external diametrical size of the corresponding annular rim 4 of the male sleeve 1. The annular rim 7 of the female sleeve 2 is further provided on its inwardly presented end with a machined radial abutment face 8 and on its other or joint-forming end is beveled outwardly to provide a joint face 9 complementary in size and shape to the joint face 6 of the male sleeve 1.

The collar 3 may be provided on its external surface with a knurling or a series of flat faces for facilitating the application thereto of a wrench or other tool in tightening up the joint. On its inner face adjacent to and extending inwardly from its forwad edge, the collar 3 is provided with an internal machine thread 10 for threaded engagement with the thread 5 of the male sleeve 1. Adjacent its rearward edge, the collar is integrally provided with a radially inwardly extending annular rim 11, the internal diametrical size of which is substantially larger than the external diametrical size of the pipe A' over which it is to fit, the rim 11 being designed to abut against the annular rim 7 of the female sleeve 2 for drawing the male and female sleeves of the fitting into tight joint-forming engagement.

In applying the fitting to the pipe sections A, A', respectively, the ends of the pipe A, A', which are to be fitted together, may be tinned or otherwise provided with a thin layer or coating of solder and the male sleeve 1 and the female sleeve 2, respectively, slid thereover while the solder is in molten condition. It has been found that if the pipe and the sleeves are all warmed prior to the performance of this operation, the respective sleeves will slide smoothly over the pipe despite the relatively small amount of clearance provided. The fittings are slid over the ends of the pipe, so that approximately an eight or three-sixteenths of an inch of the pipe projects outwardly from the sleeve, as shown in Figure 1. Thereupon, rings of solder 12, 13, 14, and 15, respectively are run annularly around the juncture points between the respective sleeves 1 and 2 and the pipes, as shown in Figure 2. As soon as the rings of solder have become thoroughly cooled, the projecting portions of pipe and solder are trimmed down with a conventional type of union-facing tool to provide complementary interfitting joint-forming faces, whereupon the collar 3 may be drawn over the female sleeve 2 and threaded onto the male sleeve 1, drawing the respective pipe sections and the sleeves 1 and 2 into tight joint-forming position, as shown in Figure 3. It may be stated in this connection that the union-facing tool may readily be adjusted, so that, in facing off the above-mentioned projecting portions of pipe and solder, a very slight film of solder will be left on the joint-forming faces 6 and 9, respectively, of the sleeves 1 and 2, thereby providing a completely tight sanitary and entirely accessible juncture between the pipe and the respective parts of the fitting or union. By reference to Figure 3, it will furthermore be noted that the joint between the pipe sections A, A', is substantially a "pipe-to-pipe" type of juncture. It will be readily apparent that when the joint is taken apart for cleaning, the crevice into which the bacterial matter may creep is readily accessible to the cleaning and sterilizing agents which may be used. Furthermore, the inner surfaces of the pipe or conduit which are exposed to the beverage passing therethrough are entirely smooth and do not present any crevices or protuberances against which bacterial matter may lodge.

In the event that it is not desired to tin the outer surface of the pipe before applying the male and female sleeves thereto, the sleeves may with equal facility be provided somewhat less clearance and either slid directly over the pipe or even shrunk thereon by the conventional heat-shrinking process. Thereupon, the solder rings 12, 13, 14, 15, may be applied and the fitting finished in the same manner as above described.

In certain cases, it may be found desirable to avoid cutting down the actual pipe projection, as above described. In such a case, a male sleeve 1' and a female sleeve 2' may be constructed substantially in the same manner as previously described, except adjacent the inner portion of the respective beveled joint faces 6', 9', the sleeves may each be provided with annular recesses 16, 17. The sleeves are thereupon fitted over the pipe in any of the manners above described, so that the pipe ends project outwardly into the recesses 16, 17, respectively, but not beyond the line of the beveled joint faces 6', 9'. Inner solder rings 13', 14', may be run into the recesses 16, 17, respectively, and faced off flush with the beveled faces 6', 9', in the formation of a joint, all as best seen in Figure 4. This modification is particularly useful in cases where it is desired to have an almost gasketed fitting to withstand relatively great changes in temperature and pressure, the faced-off inner rings of solder 13', 14', actually functioning in a manner similar to lead gaskets and yet at the same time having all the advantages of a machined fitting. In case it is desirable to avoid any machining or facing off of the inner rings of solder, the solder rings may be so constructed as to only partially fill the recesses 16, 17, as best seen in Figure 5.

In some instances, it has been found desirable to employ a form of flared joint. In such a case, a male fitting 18 may be constructed in substantially the same manner as has been previously described, except that the joint-forming face 19 thereof is beveled outwardly rather than inwardly. Instead of employing a female fitting, as has been above described, the pipe section A'' is flared outwardly at an angle complementary to the bevel face 19 of the male fitting 18 and is provided with a collar 20, which is internally threaded to fit over the threaded portion of the male sleeve 18 and is also provided at its rearward end with an annularly inwardly extending rim 21, the inner face of which is beveled at an angle complementary to the beveled face 19 of the male fitting 18. When the flared section of the pipe is placed within the collar 20 and the collar is threaded onto the male sleeve 18, a secure and tight joint will result, as shown in Figure 6.

It has also been found that the male member 18 and the collar 20 may be employed by flaring the pipe section A''' backwardly against the beveled face 19 thereof in the formation of a joint, as best seen in Figure 7.

It will be evident that by the present invention it is possible to provide pipe couplings and fittings which are unusually sanitary, are readily accessible for cleaning purposes, and at the same time are unusually simple, sturdy, rugged, and economical in construction and may be installed with a minimum of labor cost.

It should be understood that changes and modifications in the form, construction, arrangement, and combination of the several parts of the pipe couplings may be made and substituted for those herein shown and described without departing from the nature and principle of our present invention.

Having thus described our invention, what we claim and desire to secure by Letters Patent is,—

1. A ground pipe joint wherein the joint elements are adapted to be held in abutting relation by a coupling nut, each element comprising a pipe and a sleeve secured thereto, each sleeve being provided with a beveled end forming with the pipe a solder receiving recess, each of the abutting ends presenting, after being ground to fit, a substantially integral face with the solder forming an intermediate zone thereof.

2. A ground pipe joint comprising a pair of endwise abutting complementary elements releasably held in abutting relation by a coupling nut, each of said elements including a pipe and a sleeve secured thereto, each sleeve being provided with a seat-forming end-face extending outwardly from and annularly around the outer surface of the pipe, an annular ring of solder extending around the outer surface of the pipe and along the collar end-face, said elements presenting, after being ground for complementary endwise abutting fit, a substantially integral joint-face including an inner annular surface formed by the pipe and a substantially concentric annular surface formed by the solder.

CARL HAMPE.
EVERETT KLEISLY.